US010703354B2

(12) United States Patent
Zhang et al.

(10) Patent No.: US 10,703,354 B2
(45) Date of Patent: Jul. 7, 2020

(54) VEHICLE TRANSMISSION OPERATION (71) Applicant: Ford Global Technologies, LLC, Dearborn, MI (US)

(72) Inventors: Chen Zhang, Canton, MI (US); Yanan Zhao, Ann Arbor, MI (US); Todd Mccullough, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 231 days.

(21) Appl. No.: 15/983,757

(22) Filed: May 18, 2018

(65) Prior Publication Data
US 2019/0351891 A1 Nov. 21, 2019

(51) Int. Cl.
*B60W 20/10* (2016.01)
*B60W 10/02* (2006.01)
(Continued)

(52) U.S. Cl.
CPC .......... *B60W 20/10* (2013.01); *B60W 10/026* (2013.01); *B60W 10/06* (2013.01); *B60W 10/08* (2013.01); *B60W 30/143* (2013.01); *B60W 10/20* (2013.01); *B60W 2540/10* (2013.01); *B60W 2552/00* (2020.02); *B60Y 2200/92* (2013.01); *Y10S 903/93* (2013.01); *Y10S 903/946* (2013.01)

(58) Field of Classification Search
CPC ...... F16H 3/006; F16H 57/0006; F16H 37/06; F16H 47/06; F16H 61/02; F16H 61/143; F16H 61/684; F16H 63/46; F16H 61/14; F16H 61/0213; F16H 61/21; F16H 59/66; B60W 10/06; B60W 10/02; B60W 10/115; B60W 20/10; B60W 10/023; B60W 10/026; B60W 20/40; B60W 10/08; B60W 30/18; B60W 20/00; B60W 30/188; B60W 20/17; B60W 30/18118; B60W 30/18018; B60W 10/11; B60W 10/184; B60W 30/143; B60W 2552/00; B60W 2540/10; F16D 48/06; B60K 6/26; B60K 6/48; B60K 6/547; B60K 6/405; B60L 15/2081; B60L 15/2018; B60L 50/61; B60L 15/2054; B60L 50/40; B60Y 2200/92; Y10S 903/93; Y10S 903/946
See application file for complete search history.

(56) References Cited

U.S. PATENT DOCUMENTS 7,578,769 B2 8/2009 Kageyama et al.
2007/0254763 A1* 11/2007 Maucher ................ F16H 3/006
475/31

(Continued)

FOREIGN PATENT DOCUMENTS

JP 2010286040 A 12/2010
JP 2011028697 A 10/2011
(Continued)

*Primary Examiner* — Behrang Badii
(74) *Attorney, Agent, or Firm* — Frank A. MacKenzie; Bejin Bieneman PLC (57) ABSTRACT A system includes a computer including a processor and a memory, the memory storing instructions executable by the processor to plan a plurality of vehicle speeds for an upcoming road segment, adjust one or more of the planned speeds based on a predicted torque loss including a penalty based on a predicted torque impeller speed, and actuate a propulsion according to the planned speeds to lock a torque converter clutch.

20 Claims, 5 Drawing Sheets

(51) Int. Cl.
  *B60W 10/06* (2006.01)
  *B60W 10/08* (2006.01)
  *B60W 30/14* (2006.01)
  *B60W 10/20* (2006.01)

(56) References Cited

U.S. PATENT DOCUMENTS

| | | | |
|---|---|---|---|
| 2011/0174585 A1 | 7/2011 | Kleila et al. | |
| 2012/0296536 A1* | 11/2012 | Lee | F16H 61/143 701/54 |
| 2013/0196816 A1* | 8/2013 | Natsume | B60K 6/48 477/3 |
| 2013/0288853 A1* | 10/2013 | Miyazaki | B60K 6/48 477/5 |
| 2013/0296103 A1* | 11/2013 | Dai | B60W 10/08 477/5 |
| 2013/0296116 A1* | 11/2013 | Dai | B60W 10/06 477/5 |
| 2013/0296123 A1* | 11/2013 | Doering | B60W 10/02 477/5 |
| 2013/0297123 A1* | 11/2013 | Gibson | F16H 57/0006 701/22 |
| 2017/0328292 A1 | 11/2017 | Leone et al. | |

FOREIGN PATENT DOCUMENTS

| | | |
|---|---|---|
| JP | 2014231894 A | 12/2014 |
| JP | 2016047677 A | 4/2016 |

* cited by examiner

VEHICLE TRANSMISSION OPERATION

BACKGROUND

Torque converters in vehicles allow transmission of rotational output from a propulsion (e.g., an internal combustion engine and/or an electric motor) to a transmission. A torque converter transmits propulsion output to transmission input, increasing or maintaining the rotation speed of the transmission to the rotation speed of the propulsion. However, some of the propulsion output can be lost as a torque loss in the torque converter. To reduce the torque loss, a torque converter clutch can lock the torque converter to the propulsion, directly transmitting rotation from the propulsion to the transmission. However, it is a problem to identify when torque converter clutches can be operated to reduce torque loss, and to adjust operation of a vehicle to lock a torque converter clutch to reduce the torque loss.

DETAILED DESCRIPTION

A system includes a computer including a processor and a memory, the memory storing instructions executable by the processor to plan a plurality of vehicle speeds for an upcoming road segment, adjust one or more of the planned speeds based on a predicted torque loss including a penalty based on a predicted torque impeller speed, and actuate a propulsion according to the planned speeds to lock a torque converter clutch.

The instructions can further include instructions to determine a second penalty for the predicted torque loss based on a torque demand and adjust the one or more planned speeds based on the second penalty.

The instructions to actuate the propulsion can further include instructions to adjust at least one of a spark timing and a motor torque of the propulsion to lock the torque converter clutch.

The instructions to adjust one or more of the planned speeds can further include instructions to determine a difference between the predicted torque impeller speed and a predicted transmission turbine speed and to adjust the planned vehicle speeds to reduce the difference below a threshold.

The instructions can further include instructions to predict a plurality of torque demands for the upcoming road segment based on predicted accelerations of the vehicle on the road segment. The instructions can further include instructions to determine a second penalty for the torque loss based on the plurality of torque demands.

The instructions to actuate the propulsion can further include instructions to, while the vehicle is traveling in the road segment, reduce propulsion output to lock the torque converter clutch.

The instructions to actuate the propulsion can further include instructions to, while the vehicle is traveling in the road segment, actuate a fuel injector to lock the torque converter clutch.

The instructions to adjust the vehicle speeds can further include instructions to determine the penalty when the torque converter clutch is predicted to be unlocked and to determine a second penalty based on a predicted torque demand when the torque converter clutch is predicted to be locked.

The instructions to adjust the vehicle speeds can further include instructions to determine the torque loss based on a cost function including a base torque loss and the penalty and to adjust the planned vehicle speeds in the vehicle speed profile based on values from the cost function.

A method includes planning a plurality of vehicle speeds for an upcoming road segment, adjusting one or more of the planned speeds based on a predicted torque loss including a penalty based on a predicted torque impeller speed, and actuating a propulsion according to the planned speeds to lock a torque converter clutch.

The method can further include adjusting at least one of a spark timing and a motor torque of the propulsion to lock the torque converter clutch.

The method can further include predicting a plurality of torque demands for the upcoming road segment based on predicted accelerations of the vehicle on the road segment.

The method can further include, while the vehicle is traveling in the road segment, actuating a fuel injector to lock the torque converter clutch.

The method can further include determining the torque loss based on a cost function including a base torque loss and the penalty and adjusting the predicted vehicle speeds based on values from the cost function.

A system includes a vehicle propulsion, a torque converter connected to the propulsion including a torque converter clutch and an impeller, means for planning a plurality of vehicle speeds for an upcoming road segment, means for adjusting one or more of the planned speeds based on a predicted torque loss including a penalty based on a predicted torque impeller speed, and means for actuating the propulsion according to the planned speeds to lock the torque converter clutch.

The system can further include means for adjusting at least one of a spark timing and a motor torque of the propulsion to lock the torque converter clutch.

The system can further include means for predicting a plurality of torque demands for the upcoming road segment based on predicted accelerations of the vehicle on the road segment.

The system can further include for actuating a fuel injector to lock the torque converter clutch while the vehicle is traveling in the road segment.

The system can further include means for determining the torque loss based on a cost function including a base torque loss and the penalty and means for adjusting the planned vehicle speeds based on values from the cost function.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Locking a torque converter clutch in a torque converter based on impeller speeds can reduce torque loss between the propulsion and the transmission. Adjusting vehicle speeds to increase an amount of time, during which the torque converter clutch is locked can improve fuel efficiency by increasing an amount of torque transmitted from the propulsion to the transmission. Furthermore, while operating the vehicle at planned speeds, reducing propulsion output by, e.g., adjusting a spark timing, reducing electric motor torque, etc., to maintain the torque converter clutch in a locked position further reduces torque loss and improves fuel efficiency.

Figure 1:
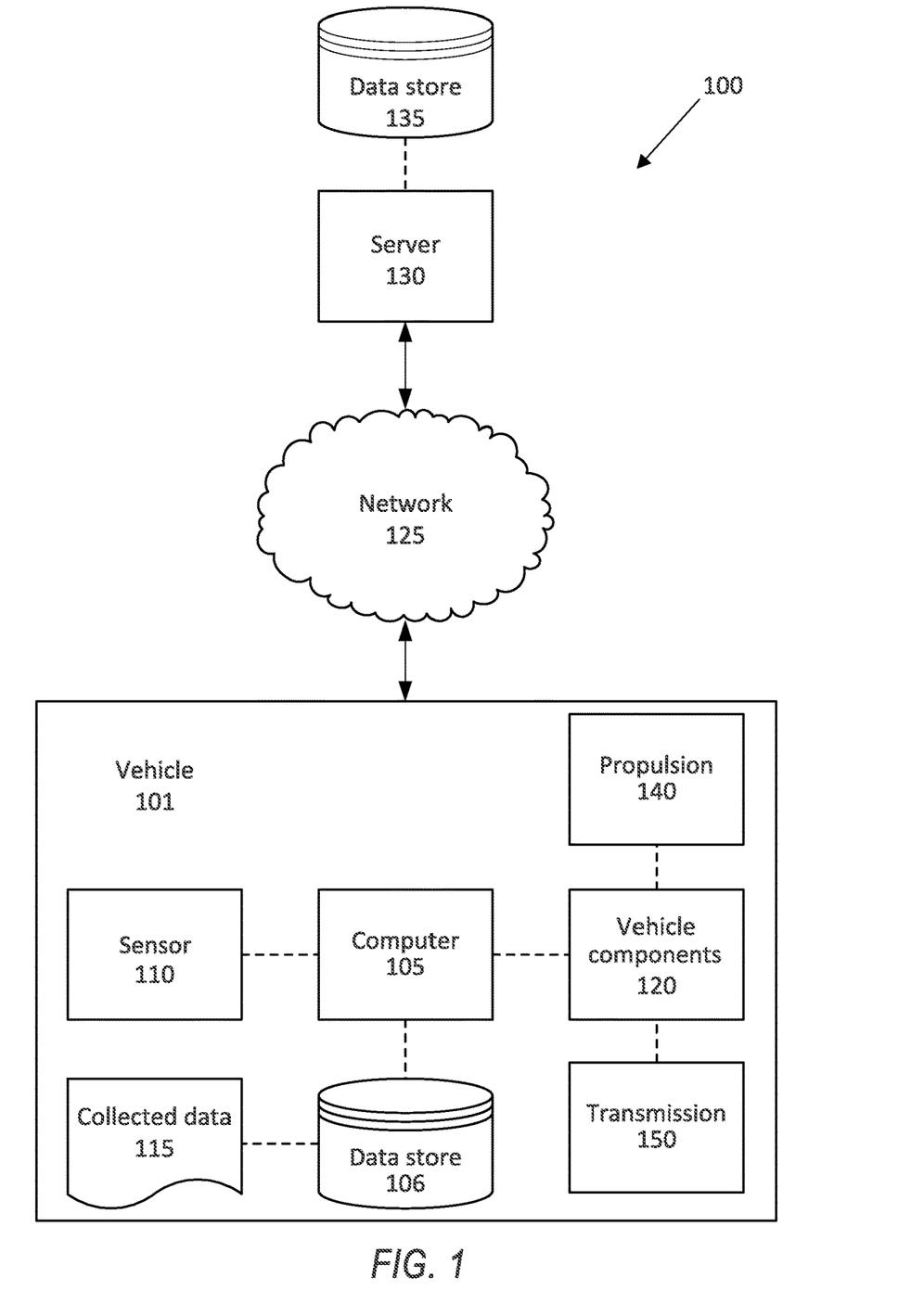
FIG. 1 is a block diagram for an example system for operating a torque converter.

FIG. 1 illustrates an example system 100 for operating a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105, without human input, e.g., to accelerator or brake pedals, or to a steering wheel. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 101 includes a propulsion 140. The propulsion 140 can propel the vehicle 101. The propulsion 140 can be, e.g., an internal combustion engine, an electric motor, a hybrid propulsion with both an internal combustion engine and an electric motor, etc. The computer 105 can actuate the propulsion 140, e.g., by actuating a fuel injector and/or the electric motor.

The vehicle 101 includes a transmission 150. The transmission 150 converts input from the propulsion 140 to rotation of vehicle 101 wheels, propelling the vehicle 101.

Figure 2:
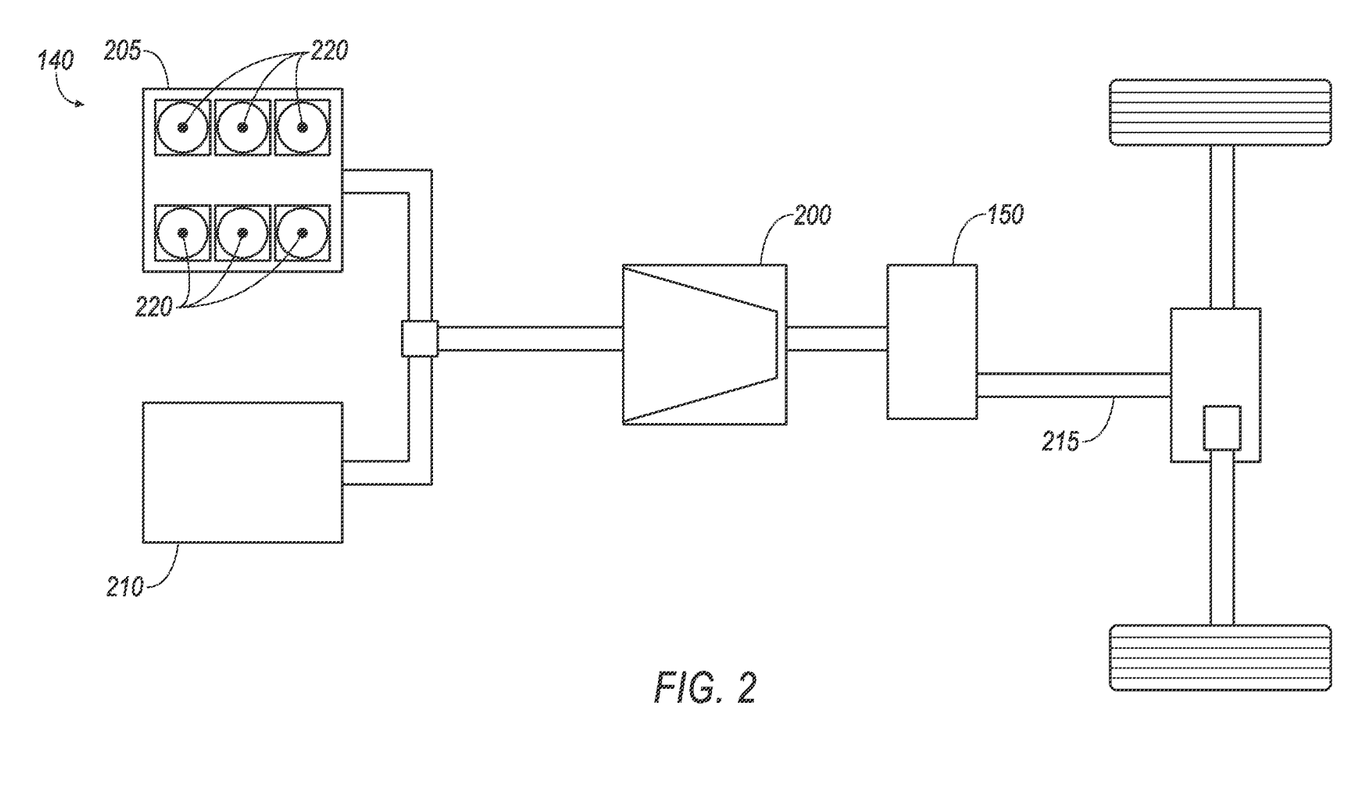
FIG. 2 illustrates an example propulsion and an example transmission.

FIG. 2 illustrates an example propulsion 140 and transmission 150. The transmission 150 includes a torque converter 200. The example propulsion 140 is shown as a hybrid-electric propulsion including an internal combustion engine 205 and an electric motor 210. Alternatively, for example, the propulsion 140 could be one of an internal combustion engine 205 or an electric motor 210.

The transmission 150 receives rotational input from the propulsion 140 and transmits the rotational input to a shaft 215 that rotates vehicle 101 wheels. The propulsion 140 can rotate at speeds (e.g., rotational speed can be measured in revolutions per minute) higher than the wheels can rotate. For example, the propulsion 140 can provide rotational output at 1500-3000 revolutions per minute, and the wheels can rotate at 500-1500 revolutions per minute. To accommodate the difference in the rotational speeds, the transmission 150 can include a plurality of conventional gears of differing sizes to reduce the rotational output. The transmission 150 can include a plurality of gears of differing sizes that the computer 105 selects to transmit power to the wheels based on the current vehicle 101 speed and rotation speed of the propulsion 140.

The transmission 150 includes the torque converter 200. The torque converter 200 receives rotation generated by the propulsion 140 and transmits a slower rotation to the transmission 150. The torque converter allows the transmission 150 to receive rotation slower than the output from the propulsion 140. As the rotation speed reduces in the torque converter 200, the torque to the transmission 150 increases, increasing torque to the vehicle 101 wheels. This increase in transmission torque, i.e., torque multiplication, can be useful during acceleration of the vehicle 101 to more quickly rotate the vehicle 101 wheels.

The propulsion 140 can include one or more spark plugs 220. When the propulsion 140 includes an internal combustion engine 205, the spark plug 220 can ignite fuel to propel a piston. The internal combustion engine 205 includes a piston and a cylinder (not shown). In a four-stroke internal combustion engine, a crankshaft (not shown) rotates two complete revolutions per fuel injection; the two revolutions comprise an "engine cycle," and has a "cycle timing" based on the rotation of the crankshaft from 0 to 720 degrees. The engine cycle starts when the piston is at a farthest point in the cylinder, at which rotation of the crankshaft is 0 degrees and defined as "top dead center" (TDC). The computer 105 can actuate the spark plug 220 to ignite the fuel at a specific time in the engine cycle, and this specific time is the "spark timing." The spark timing 220 is an angle relative to TDC at which the computer 105 actuates the spark plug 220, e.g., 5 degrees before TDC (bTDC), 10 degrees after TDC (aTDC), etc. When the computer 105 determines to reduce output from the propulsion 140, the computer 105 can retard the spark timing 220, causing the fuel to ignite earlier in the engine cycle and reducing output from the propulsion 140. As used herein, to "retard" the spark timing, as is known, is to actuate the spark plug 220 at an angle earlier in the engine cycle than the previous engine cycle. For example, if the previous cycle actuated the spark plug 220 at 5 degrees bTDC, the computer 105 can retard the spark timing 220 to, e.g., 10 degrees bTDC, 12 degrees bTDC, 15 degrees bTDC, etc.

The propulsion 140 can include an electric motor 210. When the propulsion 140 includes an electric motor 210, the computer 105 can actuate the motor 210 to propel the vehicle 101. When the computer 105 determines to reduce output from the propulsion 140, the computer 105 can reduce rotation of the motor 210, reducing output to the torque converter 200. In a hybrid propulsion 140, the computer 105 can actuate one or both of the internal combustion engine 205 and the electric motor 210 to propel the vehicle 101. FIG. 2 shows the internal combustion engine 205 and the electric motor 210 in parallel connected to the torque converter 200. Alternatively, the internal combustion engine 205 and the electric motor 210 can be arranged in a different arrangement, e.g., the electric motor 210 between the internal combustion engine 205 and the torque converter 200, the electric motor on a flywheel side of the internal combustion engine 205, the internal combustion engine 205 between the electric motor 210 and the transmission 150, etc.

Figure 3:
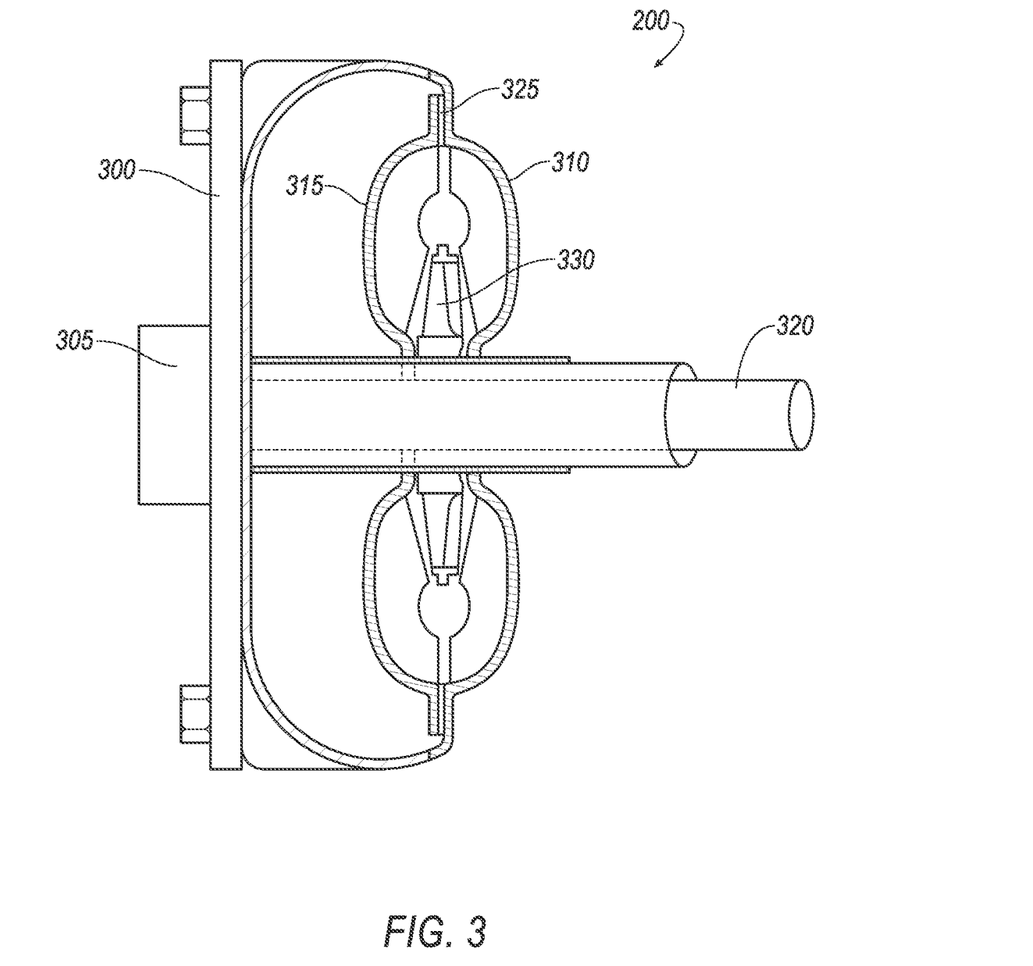
FIG. 3 illustrates an example torque converter.

FIG. 3 illustrates an example torque converter 200. The torque converter 200 can receive input from the propulsion 140 and transfer the input to the transmission 150. The torque converter includes a casing 300. The casing 300 surrounds other components of the torque converter 200.

The torque converter 200 is connected to a flywheel 305. The flywheel 305 is fixed to the casing 300. The flywheel 305 receives rotational input from the propulsion 140, rotating the flywheel 305 and the casing 300. The flywheel 305 is attached to an impeller 310. As used herein, and as is commonly understood, an "impeller" is a rotating component that is attached to the flywheel 305 and pushes transmission fluid into the torque converter 200. The impeller 310 rotates with the flywheel 305, pushing on transmission fluid in the casing 300. As used herein, an "impeller speed" is a speed of rotation (i.e., rotational speed) of the impeller 310. The impeller 310 can be fixed to the flywheel 305, and the rotational speed of the flywheel 305 (i.e., rotation of output from the propulsion 140 measured with conventional sensors 110) is the impeller 310 speed. For a planned vehicle 101 speed, the computer 105 can predict the impeller 310 speed based on a predicted propulsion 140 output to attain the planned vehicle 101 speed. That is, the computer 105 can be programmed to actuate the propulsion 140 to accelerate or decelerate the vehicle 101 to the planned vehicle 101 speed, and the actuation of the propulsion 140 results in a rotational output of the propulsion 140 that is measured by conventional sensors 110. This rotational output rotates the flywheel 305 and the impeller 310 to a specific speed, i.e., the impeller 310 speed. Thus, based on the planned vehicle 101 speed, the computer 105 can predict the impeller 310 speed to attain the planned vehicle 101 speed.

The torque converter 200 includes a turbine 315. The propulsion 140 rotates the flywheel 305, rotating the impeller 310 and pushing transmission fluid to the turbine 315. The fluid rotates the turbine 315 at a turbine 315 speed. The turbine 315 is fixed to an output shaft 320. The output shaft is attached to the transmission 150.

For a planned vehicle 101 speed, the computer 105 can determine a turbine 315 speed:

$$v_T = \frac{v \cdot R_g \cdot R_{fd}}{R_w} \quad (1)$$

where $v_T$ is the turbine 315 speed, $v$ is the planned vehicle 101 speed, $R_g$ is a gear torque ratio of the transmission 150, as is known, $R_{fd}$ is a final drive ratio between the transmission 150 and the vehicle 101 wheels, as is known, and $R_w$ is the vehicle 101 wheel radius, as is known.

Based on a torque converter turbine torque $\tau_C$, the turbine 315 speed $v_T$ can be used to determine an impeller 310 speed $v_I$:

$$\tau_C = \frac{v_I^2 \cdot f_1\left(\frac{v_T}{v_I}\right)}{f_2\left(\frac{v_T}{v_I}\right)^2} \quad (2)$$

where $\tau_C$ is the torque converter turbine torque generated by the torque converter 200, $$f_1\left(\frac{v_T}{v_I}\right)$$

is an empirical correlation between the ratio of the turbine 315 speed $v_T$ and the impeller 310 speed $v_I$ and the ratio between the torque input from the propulsion 140 and the torque output from the torque converter 200 and $$f_2\left(\frac{v_T}{v_I}\right)$$

is an empirical correlation between the ratio of the turbine 315 speed $v_T$ and the impeller 310 speed $v_I$ and the torque converter 200 capacity factor. The correlations $f_1$ and $f_2$ can be determined with conventional torque converter characterization tests can be stored as look-up tables in the data store 106. The computer 105 can solve Equations 1 and 2 for $v_I$ to determine a predicted impeller 310 speed for a planned vehicle 101 speed.

The torque converter 200 includes a torque converter clutch 325. The torque converter 325 is a component that transfers rotational motion from the impeller 310 to the turbine 315, e.g., a bushing, a friction surface, a post, etc. The torque converter clutch 325 is disposed between the impeller 310 and the turbine 315. When the impeller 310 starts to turn, the impeller 310 pushes on fluid between the impeller 310 and the turbine 315, slowly increasing the turbine 315 speed. As the turbine 315 speed increases and the fluid between the impeller 310 and the turbine 315 increases in speed, the increase in speed reduces pressure in the fluid by the Bernoulli effect. Thus, the higher pressure outside of the turbine 315 pushes the turbine 315 toward the impeller 310 until the torque converter clutch 325 engages the impeller 310 and the impeller 310 directly rotates the turbine 315. When the torque converter clutch 325 is not engaged with the impeller 310, the torque converter clutch 325 is "unlocked" or in the "unlocked position." When the torque converter clutch 325 engages the impeller 310, the torque converter clutch 325 is "locked" or in the "locked position."

When the torque converter clutch is unlocked, the transmission fluid pushed by the impeller 310 rotates the turbine 315. When the transmission fluid is pushed by the impeller 310, energy can be lost in the transmission fluid, e.g., from viscous dissipation, flow of the fluid that is not transferred to the turbine 315, heat generated by movement of the fluid that is transferred to the parts of the torque converter 200, etc. Because energy can be lost in the transmission fluid and/or converted into torque transferred to the transmission 150, the turbine 310 rotates at a turbine 315 speed that is slower than the impeller 310 when the torque converter clutch 325 is unlocked. The difference between the impeller 310 speed and the turbine 315 speed is defined as "slip." Because the turbine 315 speed is lower than the impeller 310 speed, the transmission 150 receives torque through the fluid in the torque converter 200 rather than directly from the flywheel 305. When the torque converter clutch 325 is locked, the impeller 310 directly rotates the turbine 315, and the turbine 315 speed is the same as the impeller 310 speed. Thus, when the torque converter clutch 325 is locked, substantially all of the torque generated by the propulsion 140 is transferred to the impeller 310, and the slip is nearly zero.

The torque converter clutch 325 can be unlocked when the vehicle 101 is accelerating. For example, based on design constraints (e.g., physical limitations of components of the propulsion 140, the torque converter clutch 325 can typically remain in the unlocked position until any one of: the vehicle 101 speed exceeds a threshold (e.g., 30 miles per hour), an accelerator pedal is no longer depressed by a vehicle 101 user, a slip is below a threshold (e.g., 50 revolutions per minute), and/or the impeller 310 speed is above a threshold (e.g., 1200 revolutions per minute). These example thresholds can indicate that the vehicle 101 is accelerating, and the thresholds can be based on the construction of the torque converter 200 and the propulsion 140, and can be determined based on empirical testing.

The torque converter 200 includes a stator 330. The stator 330 directs transmission fluid from the turbine 315 to the impeller 310, reducing energy losses from transmission fluid motion in the casing 300. The stator 330 can be disposed about the output shaft 320.

The computer 105 can identify a road segment. The "road segment" is a portion of a roadway a predetermined distance ahead of the vehicle 101. The predetermined distance can be determined based on, e.g., a range of one or more sensors 110 collecting data 115 around the vehicle 101. For example, the vehicle 101 can include a radar sensor 110 having a specific range, e.g., 500 meters. Because the radar sensor 110 can collect data 115 up to 500 meters in front of the vehicle 101, the computer 105 can identify the road segment as the next 500 meters in front of the vehicle 101. Alternatively, the vehicle 101 can include a predetermined route from a start point to an end point. When the vehicle 101 is in the autonomous or semi-autonomous modes, the computer 105 can actuate the propulsion 140 and one or more other components 120 to follow the route. The computer 105 can divide the route into a plurality of road segments, e.g., of 500 meters in length. The road segments can be of equal length, or the road segments can be of different lengths. The road segment can be the portion of the roadway for which the computer 105 plans autonomous operation of the vehicle 101.

The computer 105 can determine a speed profile including a plurality of planned vehicle speeds for an upcoming road segment. As used here, an "upcoming" road segment is the road segment in front of the vehicle 101. For example, the upcoming road segment can be the 500 meters of roadway in front of the vehicle 101 for a 500 meter road segment. In another example, when the vehicle 101 follows a predetermined route divided into road segments, the upcoming road segment can be the road segment following the road segment in which the vehicle 101 is currently travelling.

The speed profile is a plurality of planned speeds for the vehicle 101 in the upcoming road segment. The computer 105 "plans" the speeds for the speed profile by specifying values for the speeds included in the speed profile for each portion of the upcoming road segment. The planned speeds can be obtained via existing and known techniques, e.g., based on road conditions, posted speed limits, curvature of the road segment, traffic signs, and/or the presence of other vehicles 101, etc. For example, for a 500 meter road segment, the computer can plan a first speed for a first portion of the road segment (e.g., the first 200 meters) and can plan a second speed for the second portion of the road segment (e.g., the remaining length of the road segment), as shown in Table 1:

TABLE 1

Speed Profile for Road Segment of 500 Meter Length

| Vehicle Position | Speed |
| --- | --- |
| 0 meters-200 meters | 45 miles per hour |
| 200 meters-500 meters | 55 miles per hour |

Alternatively, the speed profile can have a different number of planned speeds at different intervals, e.g., 10 speeds at 50 meter intervals. Alternatively still, the planned speed in the speed profile can be a range of speeds, e.g., 40-50 mph for the vehicle position of 0-200 meters.

The computer 105 can determine a torque demand for the vehicle 101 based on the speed profile. The torque demand is a torque required to rotate the vehicle 101 wheels to a planned speed, e.g., a planned speed in the speed profile. The torque demand can be a predetermined correlation stored in the data store 106 and can be determined based on empirical testing of the vehicle 101. When the computer 105 plans speeds for the speed profile, the computer 105 can output the torque demand from the correlation stored in the data store 106.

The computer 105 can determine a torque converter clutch maximum capacity for the torque converter clutch 325. The torque converter maximum lockup capacity is the amount of torque that the torque converter clutch 325 can transfer from the propulsion 140 to the transmission 150 without slip. The maximum lockup capacity is based on the impeller 310 speed. When the torque demand from the propulsion 140 for a planned vehicle 101 speed exceeds the maximum lockup capacity, slip increases and the remaining torque is transmitted through the torque converter 200 fluid.

The computer 105 can apply a cost function to the vehicle 101 speeds in the speed profile. The cost function receives an input of a vehicle 101 speed and generates an output of a non-dimensional cost value that is a number, e.g., a number between 0 and 1, a number between 1 and 100, etc. The cost function includes a base cost, a first penalty, and a second penalty. The base cost is a function of the vehicle 101 speed, and changes based on the vehicle 101 speed. The base cost can be a conventional function, e.g., a Bayesian cost function, a risk function, etc. For example, the base cost can be an estimated fuel cost for the upcoming road segment.

The computer 105 can determine a first penalty for the cost function. The first penalty can be based on the impeller 310 speed, as described above, and the vehicle 101 acceleration and/or torque demand. The first penalty increases the cost value when the torque converter clutch 325 is capable of locking but is not locked. That is, when the torque converter clutch 325 is locked, the torque loss is reduced, and at specific impeller 310 speeds and vehicle 101 accelerations, the torque converter clutch 325 can be moved to the locked position with an adjustment in the vehicle 101 speed. The computer 105 can, based on the higher cost value, adjust the vehicle 101 speed in the speed profile to lock the torque converter clutch 325, eliminating the first penalty. For example, the computer 105 can determine that the torque converter clutch 325 is capable of locking when the impeller 310 speed exceeds 1000 RPM and the first penalty can increase based on impeller 310 speeds above 1000 RPM. The first penalty can be determined, e.g., based on the acceleration or torque demand:

$$p_1 = f_3(v_I)a = C_1 v_I a \qquad (3)$$

$$p_1 = f_3(v_1)\tau = C_1 v_I \tau \qquad (4)$$

where a is the predicted vehicle 101 acceleration for a planned vehicle 101 speed, $\tau$ is a predicted torque demand, $f_3(v_I)$ is a correlation factor that increases the penalty $p_1$ when the impeller 310 speed $v_I$ is above a predetermined threshold, and $C_1$ is a predetermined constant. For example, $f_3(v_I)$ can be a linear function increasing with increasing $v_I$, e.g., $f_3 = C_1 v_1$. Alternatively, $f_3(v_I)$ can be a different function, e.g., a polynomial function, an exponential function, a sigmoid function, etc. The predetermined threshold for the impeller 310 speed $v_I$ can be determined based on a predicted impeller 310 speed $v_I$ at which the torque converter clutch 325 is capable of locking.

The computer 105 can determine a second penalty for the cost function. The second penalty can be based on the torque demand to output the vehicle 101 speed planned in the speed profile. The second penalty increases the cost value when the torque converter clutch 325 is in the locked position and the torque demand exceeds a torque converter clutch maximum lockup capacity. As described above, the maximum lockup capacity is the amount of torque that the torque converter clutch 325 can transfer from the propulsion 140 to the transmission 150 without slip. The maximum lockup capacity is based on the impeller 310 speed. When the torque demand from the propulsion 140 for a planned vehicle 101 speed exceeds the maximum lockup capacity, slip can occur. Thus, the second penalty increases the cost value for torque demands that could lead to torque loss, and the computer 105 can determine vehicle 101 speeds in the speed profile to minimize the second penalty and reduce slip. The second penalty $p_2$ can be determined, e.g., based on the difference between the torque demand and the torque converter clutch maximum lockup capacity:

$$p_2 = f_4(\tau - \text{Lock}_C)(\tau - \text{Lock}_C) \qquad (5)$$

where $\text{Lock}_C$ is the torque converter clutch maximum lockup capacity and $f_4(\tau - \text{Lock}_C)$ is a correlation factor that increases when $\tau > \text{Lock}_C$, i.e., when the torque demand $\tau$ exceeds the torque converter clutch maximum lockup capacity $\text{Lock}_C$. The correlation factor $f_4$ can be a function that increases with increasing torque $\tau$. For example, the correlation factor $f_4$ can be a ramp function that is 0 when $\tau \leq \text{Lock}_C$ and increases linearly when $\tau > \text{Lock}_C$. Alternatively, the correlation factor $f_4$ can be, e.g., a polynomial function, an exponential function, a sigmoid function, etc.

The computer 105 can apply the cost function to each of the plurality of vehicle 101 speeds in the speed profile for the road segment to determine a cost value for each speed. As described above, the computer 105 can predict an impeller 310 speed based on a propulsion 140 output to attain the planned vehicle 101 speed. Based on the predicted impeller 310 speed and vehicle 101 acceleration for each planned vehicle 101 speed, the cost function outputs a cost value for each vehicle 101 speed. The computer 105 can plan, for each portion of the road segment described in the speed profile, the vehicle 101 speed having the lowest cost as determined by the cost function. These speeds with the lowest costs are planned by the computer 105 as the speed profile. The computer 105 can actuate the propulsion 140 according to the planned speeds in the speed profile.

The computer 105 can adjust the vehicle 101 speed based on the cost function while the actuating the propulsion 140 to attain the planned speeds in the speed profile. When the computer 105 operates the propulsion 140 to attain the planned speeds in the speed profile, the computer 105 can actuate one or more sensors 110 to determine a current impeller 310 speed and a current turbine 315 speed. As described above, the computer 105 can determine a slip value, i.e., a difference between the current impeller 310 speed and the current turbine 315 speed. When the slip value exceeds a predetermined slip threshold, i.e., the turbine 315 speed exceeds the impeller 310 speed to potentially cause torque loss, the computer 105 can actuate the propulsion 140 to reduce output from the propulsion 140, slowing the impeller 310 speed. The predetermined slip threshold can be determined based on empirical testing correlating torque losses to slip values, and the slip threshold can be determined based on a desired maximum torque loss.

While the computer 105 actuates the propulsion 140 according to the speed profile, the computer 105 can collect data 115 about the impeller 310 speed to determine whether the torque converter clutch 325 is predicted to be locked. Based on the impeller 310 speed, the computer 105 can determine a slip value, as described above. If the slip value exceeds a predetermined threshold, the computer 105 can reduce output of the propulsion 140. The computer 105 can adjust a spark timing to reduce output from the propulsion 140. As described above, when the propulsion 140 includes a spark-fired internal combustion engine, the computer 105 can actuate the propulsion 140 to fire the spark plug 220 at a specific spark timing, e.g., 5 degrees bTDC. To reduce output from the propulsion 140, the computer 105 can retard the spark timing, e.g., to 10 degrees bTDC, igniting the fuel in the cylinder earlier in the engine cycle and reducing a total output from the piston. Alternatively, the computer 105 can actuate a fuel injector to inject less fuel into the cylinder, reducing output from the propulsion 140 and thus reducing the impeller 310 speed. Alternatively, when the propulsion 140 includes an electric motor, the computer 140 can actuate the electric motor to rotate at a slower speed, reducing torque output from the electric motor.

Upon reducing the output from the propulsion 140, the computer 105 can determine another slip value. If the new slip value exceeds the slip value threshold, the computer 105 can continue to reduce output from the propulsion. If the new slip value is below the slip value threshold, the computer 105 can determine that the torque converter clutch 325 is in the locked position and can actuate the propulsion 140 to provide output according to the planned speed in the speed profile.

Figure 4:
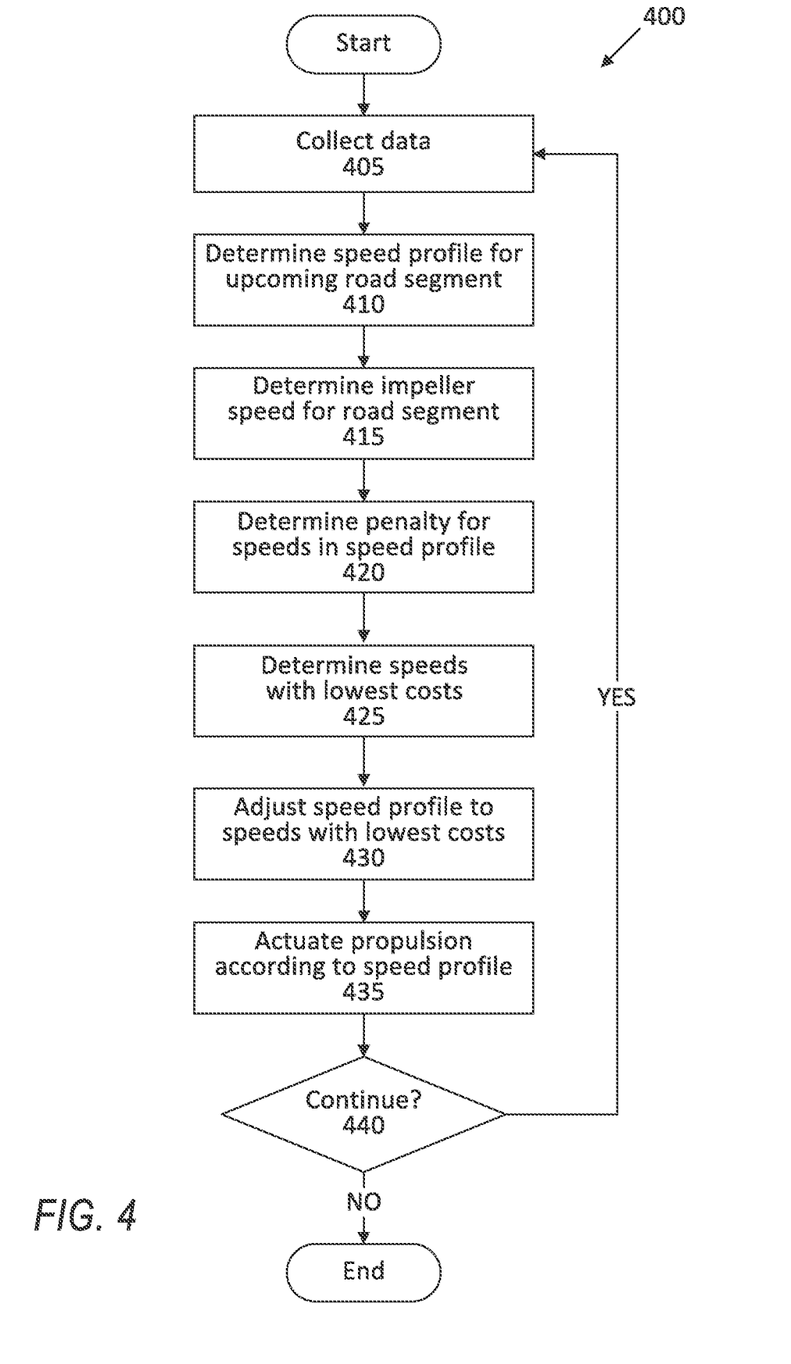
FIG. 4 is a block diagram of an example process for determining a speed profile for a vehicle.

FIG. 4 illustrates an example process 400 for planning a speed profile for a vehicle 101. The process 400 begins in a block 405, in which a computer 105 collects data 115 from one or more sensors 110 about an upcoming road segment and current operation of the vehicle 101. As described above, the upcoming road segment can be a predetermined distance, e.g., 500 meters, ahead of the vehicle 101 in which the sensors 110 can collect data 115. Thus, the upcoming road segment can change over time, in which case, the upcoming road segment can be determined in the block 405 can be determined as of a current time. Alternatively, if the vehicle 101 is following a predetermined route divided into road segments, the upcoming road segment can be the road segment subsequent to the road segment on which the vehicle 101 is currently travelling. For example, the computer 105 can collect data 115 about a vehicle 101 speed, a vehicle 101 acceleration, a road grade, etc.

Next, in a block 410, the computer 105 determines a speed profile for the upcoming road segment. As described above, the computer 105 can plan a plurality of vehicle 101 speeds for the vehicle 101 during the upcoming road segment. The vehicle 101 speeds in the speed profile can be planned based on, e.g., the distance of the upcoming road segment, the posted speed limit of the upcoming road segment, etc.

Next, in a block 415, the computer 105 determines an impeller 310 speed of an impeller 310 of a torque converter 200 based on the planned speeds. As described above, the measured impeller 310 speed can indicate whether the torque converter clutch 325 is locked, reducing torque loss from the propulsion 140 to the transmission 150.

Next, in a block 420, the computer 105 applies a cost function to the planned speeds including a penalty based on the impeller 310 speed. As described above, the penalty can increase the cost from the cost function when the torque converter clutch 325 is predicted to be unlocked, increasing torque loss from the propulsion 140 to the transmission 150.

Next, in a block 425, the computer 105 determines whether the lowest cost for the vehicle 101 speeds in the speed profile for each portion of the road segment. As described above, the lowest cost from the cost function for each vehicle 101 speed indicates that the torque converter 200 is most likely to lock.

Next, in a block 430, the computer 105 adjusts the speed profile to the speeds with the lowest costs for each portion of the road segment. As described above, the computer 105 can plan the speed in the speed profile to reduce the impeller 310 speed, reducing an amount of time that the torque converter clutch 325 is unlocked. The planned speeds in the speed profile are thus the speeds having the lowest costs for each portion of the road segment.

Next, in a block 435, the computer 105 actuates the propulsion 140 to the vehicle 101 speeds in the speed profile. The computer 105 can actuate an internal combustion engine 205 in the propulsion 140 to attain the planned speed in the speed profile. Alternatively or additionally, the computer 105 can actuate an electric motor 210 to attain the planned speed in the speed profile.

Next, in a block 440, the computer 105 determines whether to continue the process 400. For example, the computer 105 can determine that the vehicle 101 is still traveling along a roadway, requiring a speed profile and subsequently planned speeds for an upcoming road segment. If the computer 105 determines to continue, the process 400 returns to the block 405 to collect additional data 115. Otherwise, the process 400 ends.

Figure 5:
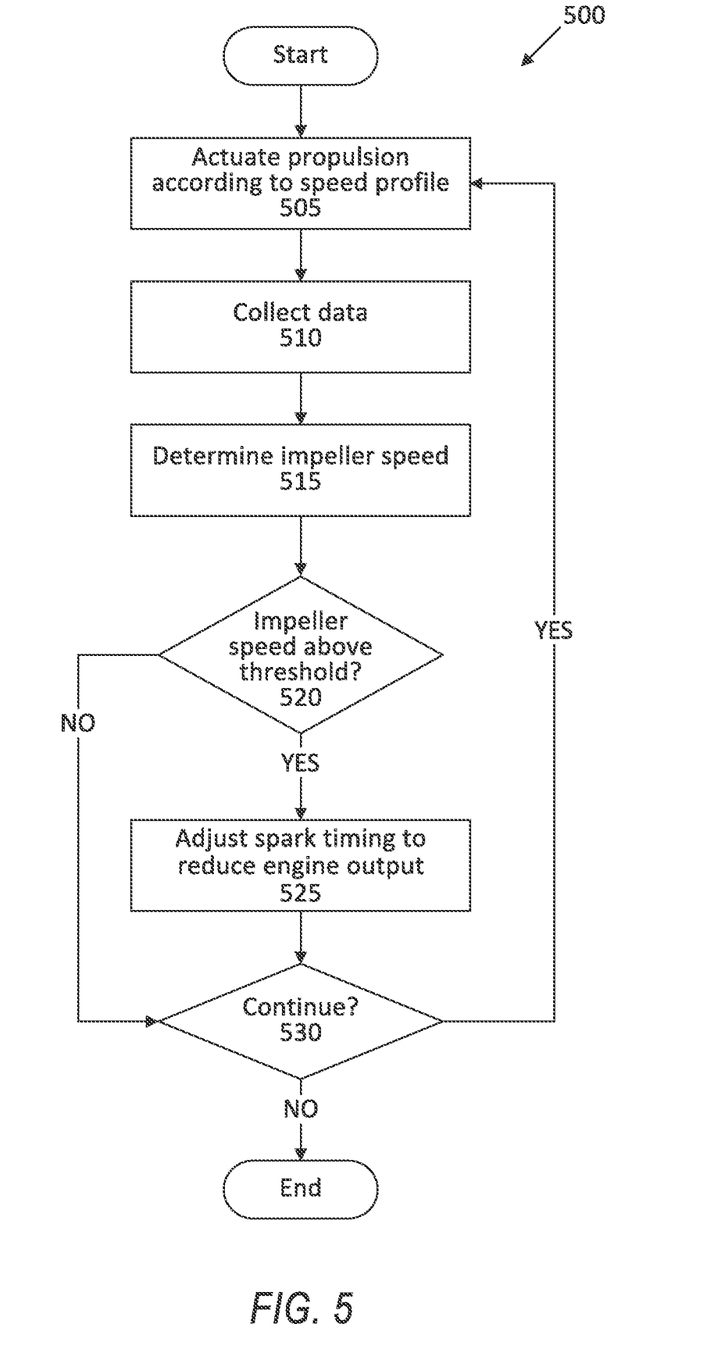
FIG. 5 is a block diagram of an example process for actuating a propulsion in the vehicle according to the speed profile.

FIG. 5 illustrates an example process 500 for actuating a propulsion 140 of a vehicle 101. The process 500 begins in a block 505, in which the computer 105 actuates the propulsion 140 according to a speed profile, e.g., the speed profile determined according to the process 400 described above. The computer 105 can actuate an internal combustion engine 205 and/or an electric motor 210 to attain a planned speed in the speed profile.

Next, in a block 510, the computer 105 collects data 115 from one or more sensors 110. The computer 105 can collect data 115 about, e.g., a vehicle 101 acceleration, an impeller 310 speed of an impeller 310 in a torque converter 200, etc.

Next, in a block 515, the computer 105 determines the impeller 310 speed of the impeller 310 in the torque converter 200. As described above, the impeller 310 speed can be determined based on a rotation speed of the flywheel 305.

Next, in a block 520, the computer 105 determines whether the impeller 310 speed is greater than a predetermined impeller 310 speed threshold. As described above, when the impeller 310 speed is above the impeller 310 speed threshold, the torque converter clutch 325 can be unlocked, increasing torque loss to the transmission 150. If the impeller 310 speed is greater than the predetermined impeller 310 speed threshold, the process 500 continues in a block 525. Otherwise, the process 500 continues in a block 530.

In the block 525, the computer 105 adjusts the propulsion 140 to reduce output to lock the torque converter clutch. For example, the computer 105 can retard the spark timing of a spark plug 220 of the internal combustion engine 205, decreasing the power output from each cycle of the internal combustion engine 205 and thus reducing the impeller 310 speed, reducing slip between the impeller 310 and the turbine 315. Alternatively, the computer 105 can reduce a torque output of the electric motor 210. Yet further alternatively, the computer 105 can reduce a fuel volume injected through a fuel injector, reducing power output from the internal combustion engine 205 and reducing the impeller 310 speed, reducing slip between the impeller 310 and the turbine 315.

In the block 530, the computer 105 determines whether to continue the process 500. For example, the computer 105 can determine the next planned speed in the speed profile and can determine to continue the process 500 to reduce torque loss at the next vehicle 101 speed. If the computer 105 determines to continue, the process 500 returns to the block 505 to actuate the propulsion 140 at the planned speed in the speed profile. Otherwise, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   plan a plurality of vehicle speeds for an upcoming road segment;
   adjust one or more of the planned speeds based on a predicted torque loss including a penalty based on a predicted torque impeller speed; and
   actuate a propulsion according to the planned speeds to lock a torque converter clutch.

2. The system of claim 1, wherein the instructions further include instructions to determine a second penalty for the predicted torque loss based on a torque demand and adjust the one or more planned speeds based on the second penalty.

3. The system of claim 1, wherein the instructions to actuate the propulsion further include instructions to adjust at least one of a spark timing and a motor torque of the propulsion to lock the torque converter clutch.

4. The system of claim 1, wherein the instructions to adjust one or more of the planned speeds further include instructions to determine a difference between the predicted torque impeller speed and a predicted transmission turbine speed and to adjust the planned speeds to reduce the difference below a threshold.

5. The system of claim 1, wherein the instructions further include instructions to predict a plurality of torque demands for the upcoming road segment based on predicted accelerations of the vehicle on the road segment.

6. The system of claim 5, wherein the instructions further include instructions to determine a second penalty for the torque loss based on the plurality of torque demands.

7. The system of claim 1, wherein the instructions to actuate the propulsion further include instructions to, while the vehicle is traveling in the road segment, reduce propulsion output to lock the torque converter clutch.

8. The system of claim 1, wherein the instructions to actuate the propulsion further include instructions to, while the vehicle is traveling in the road segment, actuate a fuel injector to lock the torque converter clutch.

9. The system of claim 1, wherein the instructions to adjust the vehicle speeds further include instructions to determine the penalty when the torque converter clutch is predicted to be unlocked and to determine a second penalty based on a predicted torque demand when the torque converter clutch is predicted to be locked.

10. The system of claim 1, wherein the instructions to adjust the vehicle speeds further include instructions to determine the torque loss based on a cost function including a base torque loss and the penalty and to adjust the planned speeds in the vehicle speed profile based on values from the cost function.

11. A method, comprising:
planning a plurality of vehicle speeds for an upcoming road segment;
adjusting one or more of the planned speeds based on a predicted torque loss including a penalty based on a predicted torque impeller speed; and
actuating a propulsion according to the planned speeds to lock a torque converter clutch.

12. The method of claim 11, further comprising adjusting at least one of a spark timing and a motor torque of the propulsion to lock the torque converter clutch.

13. The method of claim 11, further comprising predicting a plurality of torque demands for the upcoming road segment based on predicted accelerations of the vehicle on the road segment.

14. The method of claim 11, further comprising, while the vehicle is traveling in the road segment, actuating a fuel injector to lock the torque converter clutch.

15. The method of claim 11, further comprising determining the torque loss based on a cost function including a base torque loss and the penalty and adjusting the planned speeds based on values from the cost function.

16. A system, comprising:
a vehicle propulsion;
a torque converter connected to the propulsion including a torque converter clutch and an impeller;
means for planning a plurality of vehicle speeds for an upcoming road segment;
means for adjusting one or more of the planned speeds based on a predicted torque loss including a penalty based on a predicted torque impeller speed; and
means for actuating the propulsion according to the planned speeds to lock the torque converter clutch.

17. The system of claim 16, further comprising means for adjusting at least one of a spark timing and a motor torque of the propulsion to lock the torque converter clutch.

18. The system of claim 16, further comprising means for predicting a plurality of torque demands for the upcoming road segment based on predicted accelerations of the vehicle on the road segment.

19. The system of claim 16, further comprising means for actuating a fuel injector to lock the torque converter clutch while the vehicle is traveling in the road segment.

20. The system of claim 16, further comprising means for determining the torque loss based on a cost function including a base torque loss and the penalty and means for adjusting the planned speeds based on values from the cost function.

* * * * *